(12) United States Patent
Turner

(10) Patent No.: US 7,511,253 B2
(45) Date of Patent: Mar. 31, 2009

(54) APPARATUS FOR DETECTING RADIATION AND MUNITION INCORPORATING SAME

(75) Inventor: Mark A. Turner, Arlington, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 90 days.

(21) Appl. No.: 11/559,293

(22) Filed: Nov. 13, 2006

(65) Prior Publication Data

US 2008/0111053 A1    May 15, 2008

(51) Int. Cl.
*G01C 21/02* (2006.01)
*G01C 21/24* (2006.01)
*G01J 1/20* (2006.01)

(52) U.S. Cl. ............... 250/203.1; 250/203.2; 250/216; 244/3.1; 244/3.15; 244/3.16; 244/3.17; 342/52; 342/53; 342/54; 342/55; 342/56

(58) Field of Classification Search ............... 250/203.1, 250/203.2, 216; 244/3.1, 3.15–3.17; 342/52–56, 342/61, 62
See application file for complete search history.

(56) References Cited

U.S. PATENT DOCUMENTS 6,060,703 A * 5/2000 Andressen ............... 250/203.6
6,851,645 B1 * 2/2005 Williams et al. ........... 244/3.16
7,036,767 B2 * 5/2006 Chishinski ................. 244/3.16

* cited by examiner

*Primary Examiner*—Seung C Sohn
(74) *Attorney, Agent, or Firm*—Daren C. Davis; James E. Walton

(57) ABSTRACT

An apparatus for detecting radiation includes an entry window configured to receive radiation from a target, the entry window having an outer surface and an inner surface, such that the outer surface is not parallel to the inner surface. The apparatus further includes a radiation transmission assembly configured to receive at least a portion of the radiation received by the entry window. The apparatus further includes a radiation sensor configured to receive at least a portion of the radiation from the radiation transmission assembly.

17 Claims, 6 Drawing Sheets

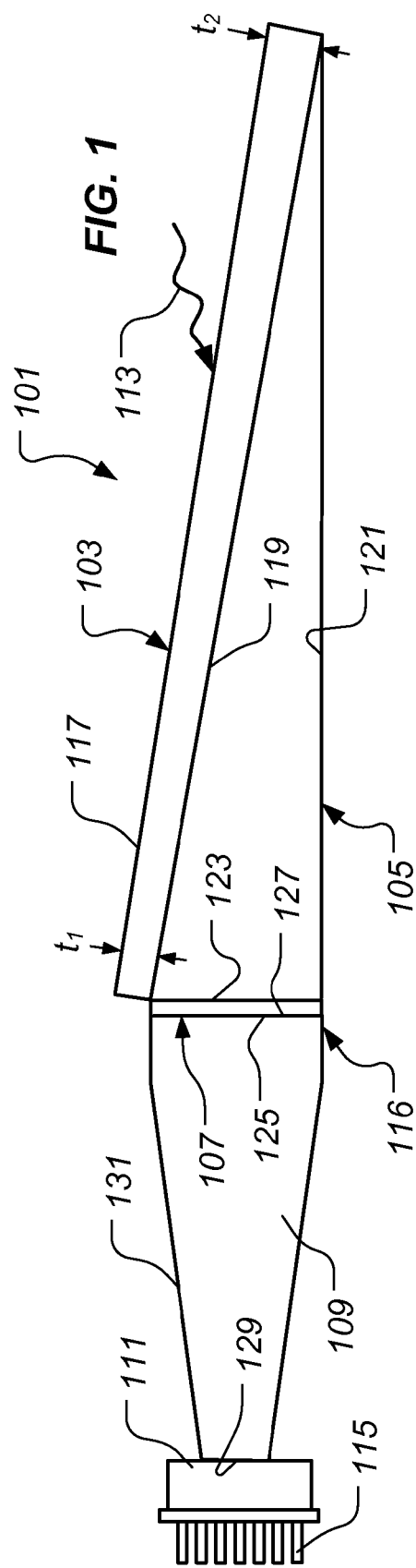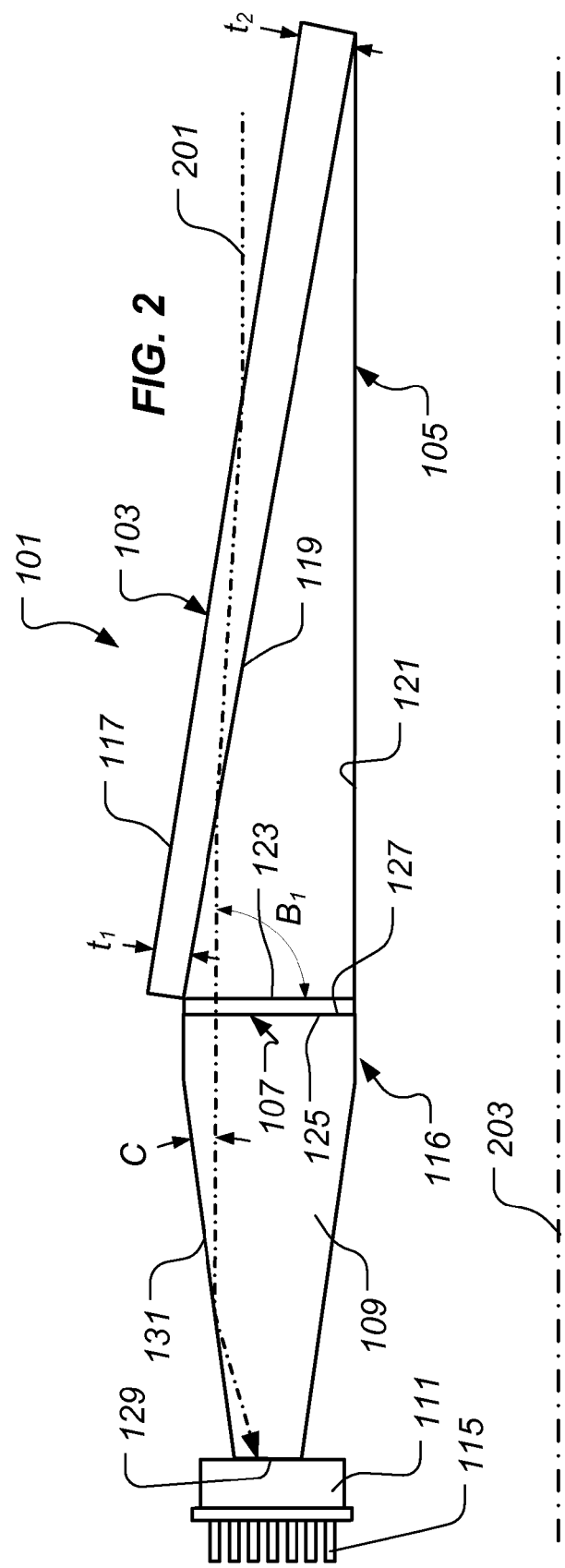

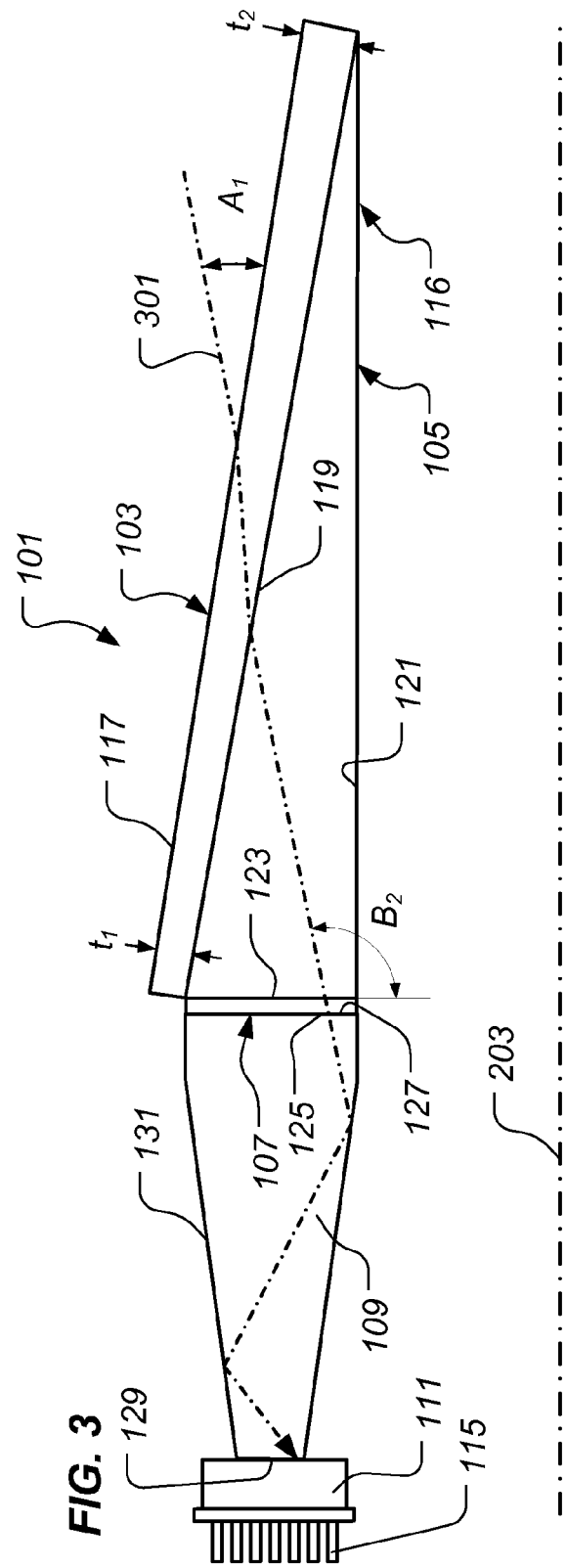

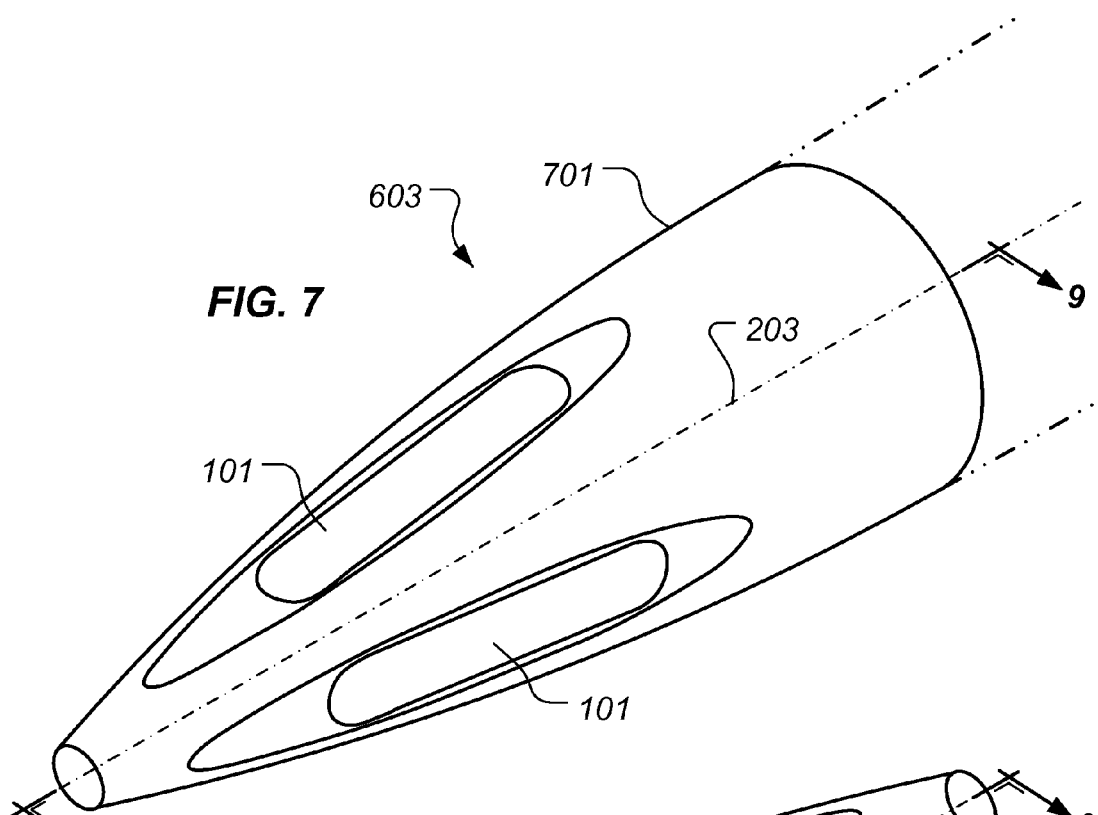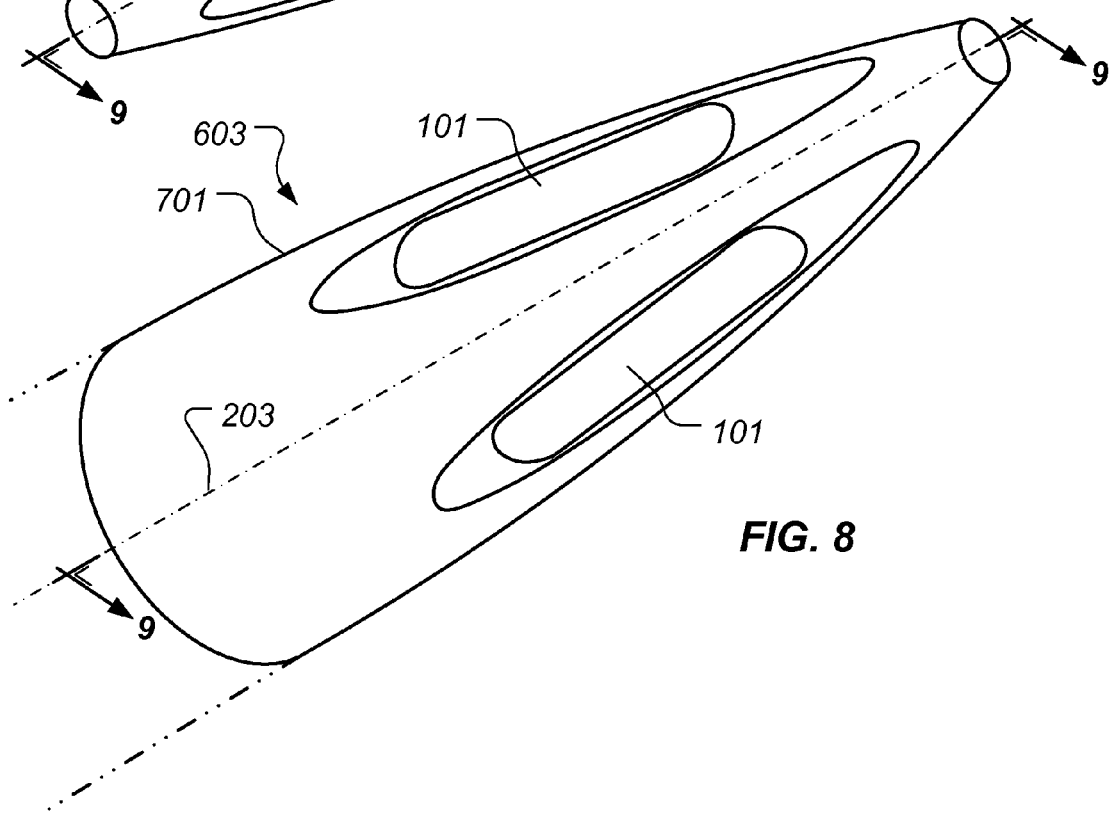

APPARATUS FOR DETECTING RADIATION AND MUNITION INCORPORATING SAME

BACKGROUND

1. Field of the Invention

The present invention relates to an apparatus for detecting radiation and a munition incorporating the apparatus.

2. Description of Related Art

Advances in technology have led to improvements in the precision of guided munitions. However, as guidance systems have become more sophisticated, the need for even greater precision is apparent. As military targets are frequently found in civilian surroundings, highly precise guidance systems are required to destroy these military targets while minimizing collateral damage to the civilian surroundings. One approach to increasing the precision of guided munitions is through using a laser designator to illuminate the desired target. The laser signal reflected from the target propagates through a radome of the guided munition. A quadrant detector within the radome of the guided munition then guides the munition to maximize the reflected laser signal received from the illuminated target. Other types of guided munitions sense types of radiation other than light.

While such laser guided munitions have been in operation for quite some time, the radome/detector design limits the velocity of these guided munitions. In particular, many of the radome/detector designs include a hemispherical radome. The velocity of a guided munition having a hemispherical radome is limited due to the radome's aerodynamic drag. In an effort to reduce this aerodynamic drag, the use of more conic-shaped radomes has been attempted. However, this change in radome shape has created problems for the detector system used to guide the munition. For example, such conic-shaped radomes typically suffer from limited field of view and poor detection of small and/or distant targets. Some designs include windows or waveguides that must conform to the outer surface of the munition or radome. Such designs suffer from the same problems, however, as conic-shaped radomes.

There are many designs of apparatuses and methods for directing electromagnetic waves well known in the art, however, considerable shortcomings remain.

SUMMARY OF THE INVENTION

There is a need for an improved apparatus for detecting radiation and a munition incorporating the apparatus.

Therefore, it is an object of the present invention to provide an improved apparatus for detecting radiation and a munition incorporating the apparatus.

This and other objects are achieved by providing an apparatus for detecting radiation. The apparatus includes an entry window configured to receive radiation from a target, the entry window having an outer surface and an inner surface, such that the outer surface is not parallel to the inner surface. The apparatus further includes a radiation transmission assembly configured to receive at least a portion of the radiation received by the entry window. The apparatus further includes a radiation sensor configured to receive at least a portion of the radiation from the radiation transmission assembly.

In another aspect, the present invention provides a munition. The munition includes a body and an apparatus for detecting radiation. The apparatus includes an entry window configured to receive radiation from a target, the entry window having an outer surface exposed from the body and an inner surface, such that the outer surface is not parallel to the inner surface. The apparatus further includes a radiation transmission assembly configured to receive at least a portion of the radiation received by the entry window. The apparatus further includes a radiation sensor configured to receive at least a portion of the radiation from the radiation transmission assembly.

The present invention provides significant advantages, including: (1) detecting radiation within a greater field of view; (2) reducing radiation loss during detection; (3) increasing the aperture within which radiation can be detected; and (4) providing a means for efficiently detecting radiation incorporated with a generally conic-shaped munition section or radome.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 1 is a stylized, schematic view of a first illustrative embodiment of an apparatus for detecting radiation according to the present invention;

FIG. 2 is a stylized, schematic view of the apparatus of FIG. 1 illustrating a first variation of a ray of radiation propagating therethrough;

FIG. 3 is a stylized, schematic view of the apparatus of FIG. 1 illustrating a second variation of a ray of radiation propagating therethrough;

FIG. 4 is a stylized, schematic view of the apparatus of FIG. 1 illustrating a third variation of a ray of radiation propagating therethrough;

FIG. 7 is a top, perspective view of a nose portion of the munition of FIG. 6;

FIG. 8 is a bottom, perspective view of the nose portion of FIG. 6;

Figure 5:
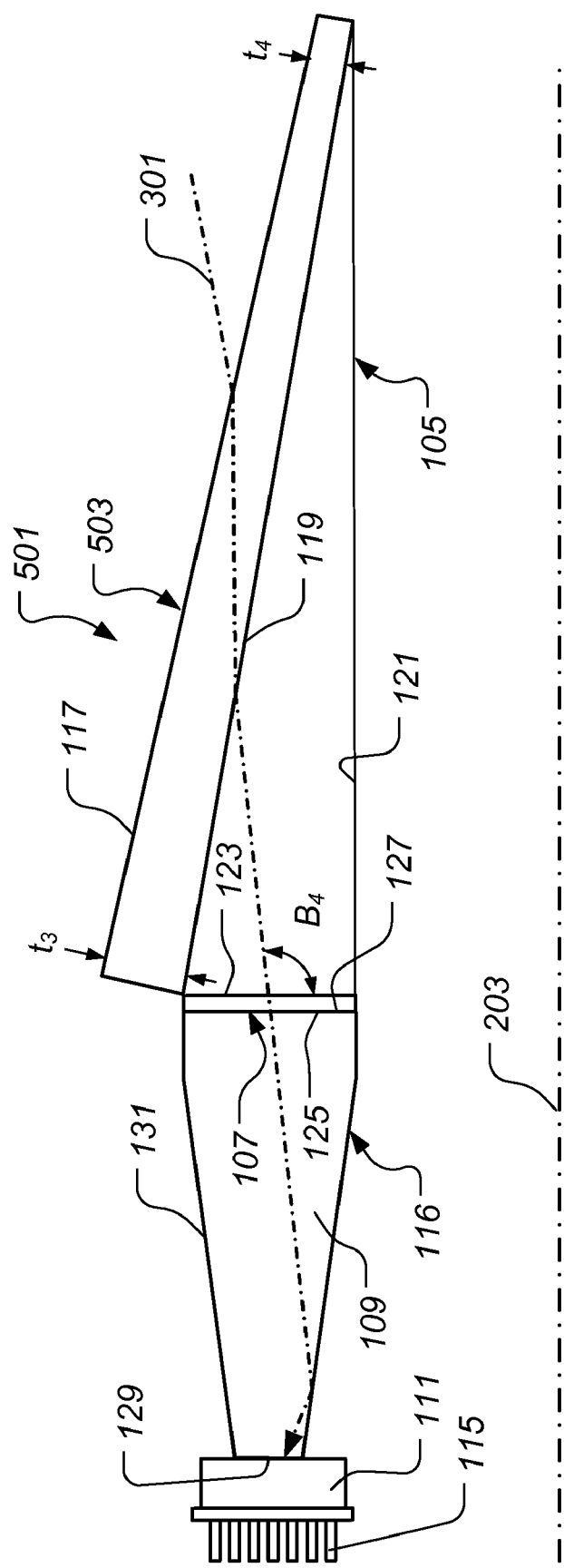
FIG. 5 is a stylized, schematic view of a second illustrative embodiment of an apparatus for detecting radiation according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents an apparatus for detecting radiation and a method of using the apparatus. The apparatus is particularly useful in a guidance system of a munition for detecting light radiating from a target.

FIG. 1 depicts a first illustrative embodiment of an apparatus 101 for detecting radiation according to the present invention. In the illustrated embodiment, apparatus 101 comprises an entry window 103, a reflective conduit 105, a filter 107, a waveguide 109, and a radiation sensor 111. Radiation 113, such as light, propagates through entry window 103 and may be reflected by reflective conduit 105 depending upon the propagation direction of the radiation upon exiting entry window 103. Radiation having certain predetermined characteristics, such as a particular wavelength or range of wavelengths of light, is allowed to propagate through filter 107. The filtered radiation then enters waveguide 109, which directs the filtered radiation toward radiation sensor 111. Radiation sensor 111 detects one or more characteristics of the filtered radiation, such as the intensity of the radiation, and converts the one or more characteristics of the filtered radiation into signals that are then transmitted via one or more contacts 115 (only one labeled for clarity).

It should be noted that, in some embodiments, filter 107 is omitted. In such an embodiment, the radiation propagates through entry window 103 and may be reflected by reflective conduit 105 depending upon the propagation direction of the radiation upon exiting entry window 103. The radiation then enters waveguide 109, which directs the radiation toward radiation sensor 111. Radiation sensor 111 detects one or more characteristics of the radiation, such as the intensity of the radiation, and converts the one or more characteristics of the unfiltered radiation into signals that are then transmitted via one or more contacts 115.

In embodiments wherein filter 107 is present, reflective conduit 105, filter 107, and waveguide 109 form a radiation transmission assembly 116 according to the present invention. In embodiments wherein filter 107 is omitted, reflective conduit 105 and waveguide 109 form a radiation transmission assembly according to the present invention, corresponding to radiation transmission assembly 116 omitting filter 107.

Still referring to FIG. 1, entry window 103 includes an outer surface 117 and an inner surface 119. In the illustrated embodiment, outer surface 117 and inner surface 119 are substantially planar. The plane defined by outer surface 117, however, is not parallel to the plane defined by inner surface 119. In other words, the planes defined by outer surface 117 and inner surface 119 intersect. Thus, entry window 103 exhibits a first thickness $t_1$ proximate radiation sensor 111 and exhibits a second thickness $t_2$, which is different from thickness $t_1$, distal from radiation sensor 111. It should be noted that, while outer surface 117 and inner surface 119 of entry window 103 are substantially planar in the illustrated embodiment, the scope of the present invention is not so limited. Rather, one or both of outer surface 117 and inner surface 119 may be nonplanar.

Entry window 103 may comprise any material that will allow radiation of the desired wavelength or range of wavelengths to propagate therethrough. In other words, entry window 103 is radiolucent at the particular wavelength or range of wavelengths of interest. For example, if the radiation of interest is light, entry window 103 may comprise a material such as glass, acrylic, or the like.

Still referring to FIG. 1, reflective conduit 105 reflects some of the radiation that propagates through entry window 103, depending upon the propagation direction of the radiation upon exiting entry window 103, as will be discussed in greater detail below. Reflective conduit 105 defines an inner surface 121 that is configured to reflect a substantial portion of the radiation striking inner surface 121. In a preferred embodiment, inner surface 121 is polished. Reflective conduit 105 may comprise any suitable material, such as aluminum or the like. Moreover, reflective conduit 105 may be a separate element or may be incorporated into another element, as will be discussed in greater detail below.

Filter 107, if present, receives radiation from reflective conduit 105 through entrance 123 and radiation that is allowed to propagate through filter 107 propagates through exit 125. Filter 107 may comprise any suitable filter for the particular implementation of apparatus 101. For example, filter 107 may substantially exclude or reflect all radiation except radiation exhibiting a particular wavelength or range of wavelengths. In one embodiment, filter 107 comprises a Fabry-Perot filter, which can be characterized as an interference filter and as a resonant optical cavity. A Fabry-Perot filter comprises a cavity bounded by partially reflective, low-absorption mirror coats on two substantially flat, substantially transparent plates. Such filters exhibit high spectral resolution and, thus, are known as narrow-band-pass filters. Other types of filters for filter 107, however, are contemplated by the present invention.

Still referring to FIG. 1, waveguide 109 receives radiation that is allowed to propagate through filter 107 from exit 125 of filter 107, if filter 107 is present. If filter 107 is omitted, waveguide 109 receives radiation from reflective conduit 105. Waveguide 109 comprises a structure having the ability to guide the flow of radiation, such as light, along a path parallel to the structure's optical axis and having the ability to contain the energy within or adjacent to the structure's surface. Examples of waveguides configured to guide light include optical fibers, light pipes, and the like. Such optical waveguides often comprise materials such as glass, acrylic, or the like.

In the illustrated embodiment, waveguide 109 comprises an entrance 127 and an exit 129. Waveguide 109 tapers from a larger dimension at entrance 127 to a smaller dimension at exit 129. Radiation enters waveguide 109 via entrance 127 and exits waveguide 109 via exit 129. Radiation exiting waveguide 109 via exit 129 enters radiation sensor 111, wherein one or more characteristics of the filtered or unfiltered radiation, such as the intensity of the radiation, are converted into signals that are then transmitted via one or more contacts 115 (only one labeled for clarity).

FIGS. 2-4 depict exemplary rays of radiation, such as light rays being visible to the human eye or non-visible to the human eye, propagating into apparatus 101. The exemplary rays have different angles of incidence with respect to entry window 103 in each of the figures. FIG. 2 depicts a ray 201 propagating substantially parallel to a boresight axis 203 of a munition, such as munition 601 of FIG. 6 (not shown in FIG. 2). FIG. 3 depicts a ray 301 propagating at an angle $A_1$ with respect to boresight axis 203. FIG. 4 depicts a ray 401 propagating at an angle $A_2$ with respect to boresight axis 203.

Referring now to FIG. 2, ray 201, or at least a portion of ray 201, propagates through entry window 103. As noted above, ray 201, prior to encountering entry window 103, propagates in a direction substantially parallel to boresight axis 203. Because inner surface 119 of entry window 103 is not parallel to outer surface 117 of entry window 103, ray 201 is refracted at a different angle at inner surface 119 than at outer surface 117. It should be noted that the embodiment of entry window 103 illustrated in FIGS. 1-4 has been generally optimized to allow ray 201 to propagate through entry window 103 and strike entrance 123 of filter 107 at an angle $B_1$ that is substantially perpendicular to entrance 123 of filter 107. Having ray 201 enter filter 107 from a direction substantially perpendicular to entrance 123 of filter 107 is particularly advantageous when filter 107 is a Fabry-Perot filter. Generally, Fabry-Perot filters exhibit significant losses when rays enter such filters at incidence angles that vary significantly from about 90 degrees. It should be noted, however, that the present invention contemplates tailoring the configuration of entry window 103 to affect the propagation direction of rays exiting entry window 103, for example, as discussed herein with respect to FIG. 5.

Still referring to FIG. 2, a portion of ray 201 propagates through filter 107, depending upon the particular characteristics of filter 107. Ray 201 enters waveguide 109 and, in the illustrated example, is reflected from a wall 131 of waveguide 109. Preferably, for rays such as ray 201 propagating through waveguide 109, the rays are totally internally reflected within waveguide 109. Total internal reflection occurs when light is refracted or bent at a medium boundary enough to send it backwards, effectively reflecting the entire ray. When a ray propagates across a boundary surface, e.g., at wall 131 of waveguide 109, between materials with different refractive indices, the ray will be partially refracted at the boundary surface and partially reflected. However, if the angle of incidence, e.g., angle C, is shallower (closer to the boundary) than the critical angle, then the ray will stop crossing the boundary altogether and, instead, totally reflect back internally within waveguide 109. The critical angle is the angle of incidence wherein a ray is refracted so that the ray travels along the boundary between the media and is defined as:

$$\theta_c = \sin^{-1}\left[\frac{n_1}{n_2}\right],$$

wherein $\theta_c$ is the critical angle, $n_1$ is the refractive index of the less dense material, and $n_2$ is the refractive index of the more dense material. Total internal reflection can only occur where a ray propagates from a denser medium to a less dense medium, i.e., from the medium with a higher refractive index to a medium with a lower refractive index. For example, total internal reflection will occur when a ray propagates from glass to air, but not when the ray propagates from air to glass.

In the example illustrated in FIG. 2, the portion of ray 201 that enters entrance 127 of waveguide 109 substantially, totally internally reflects from wall 131 of waveguide 109 into radiation sensor 111. A reflective layer (not shown) may, in some embodiments, be applied to wall 131. Thus, rays that exceed the critical angle with respect to wall 131 are substantially, totally reflected back into waveguide 109, rather than a portion of the ray being refracted at wall 131.

Referring now to FIG. 3, ray 301, or at least a portion of ray 301, propagates through entry window 103. As noted above, ray 301, prior to encountering entry window 103, propagates at an angle $A_1$ with respect to boresight axis 203. In the example provided in FIG. 3, the source of ray 301 is "above boresight." Because inner surface 119 of entry window 103 is not parallel to outer surface 117 of entry window 103, ray 301 is refracted at a different angle at inner surface 119 than at outer surface 117. Ray 301 strikes entrance 123 of filter 107 at an angle $B_2$ that, while not substantially perpendicular with respect to entrance 123, provides improved operation over conventional radiation detectors.

It should be noted that the portion of ray 301 that propagates through exit 125 of filter 107 may or may not be substantially, totally internally reflected from wall 131 of waveguide 109 into radiation sensor 111. If the portion of ray 301 that propagates through exit 125 of filter 107 is not substantially, totally internally reflected from wall 131, some losses will result. In an alternative embodiment, however, wall 131 of waveguide 109 exhibits a complexly-contoured configuration, such as described in commonly-owned, copending U.S. patent application Ser. No. 11/327,562, which is hereby incorporated by reference for all purposes. Such a configuration, in some implementations, lessens the likelihood of attenuation or loss of the amplitude of the portion of ray 301 allowed to propagate through filter 107 due to a lack of total internal reflection at wall 131 of waveguide 109. While the use of a waveguide having a complexly-contoured configuration is described concerning the embodiment and example of FIG. 3, the scope of the present invention is not so limited. Rather, a waveguide having a complexly-contoured configuration may be utilized in any embodiment of the present invention.

Referring now to FIG. 4, ray 401, or at least a portion of ray 401, propagates through entry window 103. As noted above, ray 401, prior to encountering entry window 103, propagates at an angle $A_2$ with respect to boresight axis 203. In the example provided in FIG. 4, the source of ray 401 is "below boresight." Because inner surface 119 of entry window 103 is not parallel to outer surface 117 of entry window 103, ray 401 is refracted at a different angle at inner surface 119 than at outer surface 117. Ray 401 strikes entrance 123 of filter 107 at an angle $B_3$ that, while not exactly 90 degrees with respect to entrance 123, is sufficiently close to 90 degrees to allow acceptable operation of filter 107. The portion of ray 401 that propagates through exit 125 of filter 107 is substantially, totally internally reflected from wall 131 of waveguide 109 into radiation sensor 111.

FIG. 5 depicts a second illustrative embodiment of an apparatus 501 for detecting radiation according to the present invention. Each of the components of apparatus 501, except for an entry window 503, corresponds to the components of the embodiment of FIG. 1. In the illustrated embodiment, entry window 503 is tailored to refract ray 301 more perpendicularly toward entrance 123 of filter 107. In the embodiment of FIG. 2, entry window 103 exhibits a thickness $t_2$, distal from filter 107, that is greater than thickness $t_1$, proximate filter 107. In the embodiment of FIG. 5, however, entry window 503 exhibits a thickness $t_3$, proximate filter 107, that is greater than a thickness $t_4$, distal from filter 107. While the incidence angle $B_4$ at which ray 301 strikes entrance 123 of filter 107 is not substantially 90 degrees, the configuration of entry window 503 provides an improvement in operation of filter 107 over the configuration of entry window 103.

It should be noted that the scope of the present invention is not limited to the apparatuses 101 and 501 of FIGS. 1 and 5, respectively. Rather, the present invention contemplates tailoring the configuration of at least an entry window, such as entry window 103 or 503, according to one or more characteristics of rays of radiation to be detected by the apparatus of the present invention. For example, the scope of the present invention encompasses tailoring the configuration of an entry window, such as entry window 103 or 503, according to the propagation direction of radiation rays of interest, such that the entry window does not exhibit total internal reflection.

Figure 6:
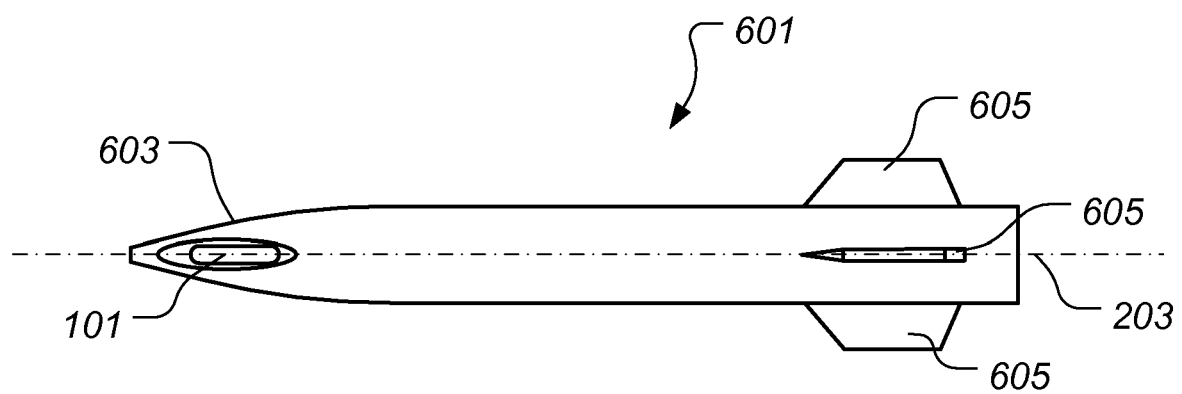
FIG. 6 is a stylized, top, plan view of a munition incorporating an embodiment of an apparatus for detecting radiation according to the present invention.

FIG. 6 depicts an illustrative embodiment of a munition 601 that includes one or more apparatuses for detecting radiation, such as apparatus 101 or 501, according to the present invention. In the illustrated embodiment, munition 601 comprises four apparatuses 101, 501, or the like disposed in a nose 603. The present invention, however, contemplates munitions wherein any suitable number of apparatuses 101, 501, or the like are disposed in a suitable portion of munition 601. Preferably, a munition according to the present invention includes a plurality of apparatuses for detecting radiation, such as apparatus 101 or 501, disposed about boresight axis 203.

Figure 9:
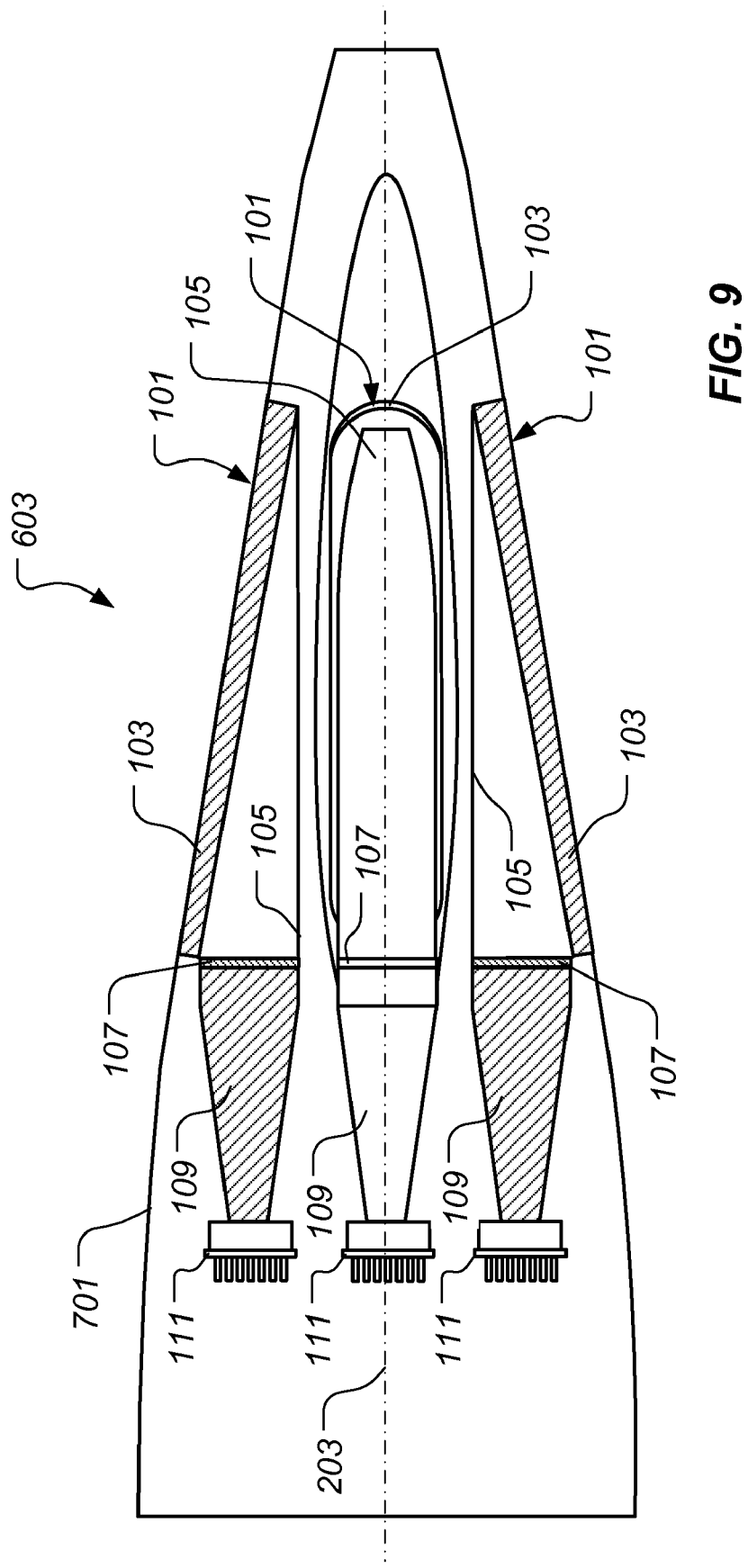
FIG. 9 is a cross-sectional view of the nose portion of FIG. 7, taken along the line 9-9 in FIGS. 7 and 8.

FIGS. 7 and 8 depict a top, perspective view and a bottom, perspective view, respectively, of an illustrative embodiment of nose 603 of munition 601 (shown in FIG. 6). FIG. 9 depicts a cross-sectional view of nose 603 taken along the line 9-9 in FIGS. 7 and 8. In the illustrated embodiment, nose 603, which is generally conic in shape, includes four apparatuses 101 (only three apparatuses 101 shown in FIG. 9) radially disposed about boresight axis 203. Entry windows 103 of apparatuses 101 are exposed through a body 701 of nose 603 to receive radiation. Radiation enters one or more of entry windows 103, as discussed herein regarding FIGS. 1-5. Referring in particular to FIG. 9, the illustrated configuration of apparatuses 101 provides a clear space between apparatuses 101 for other components of munition 601.

Figure 10:
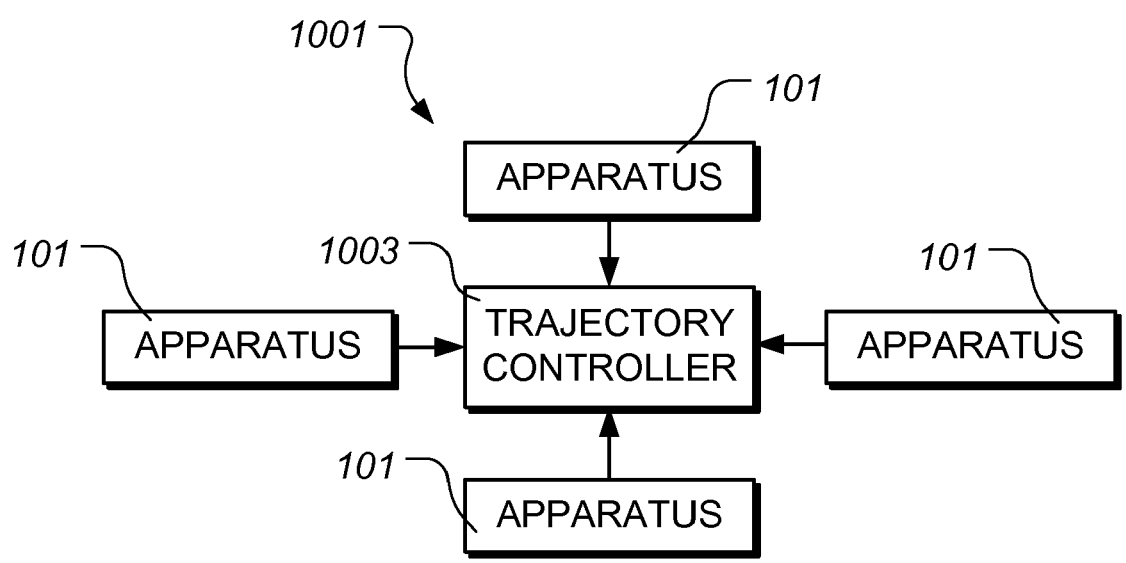
FIG. 10 is a block diagram illustrating a guidance system incorporating an embodiment of an apparatus for detecting radiation according to the present invention.

FIG. 10 depicts an illustrative embodiment of a guidance system 1001 of munition 601. In the illustrated embodiment, guidance system 1001 comprises four apparatuses 101 for detecting radiation coupled with a trajectory controller 1003. In one particular operation, each apparatus 101 provides a signal, such as an optical signal or an electrical signal, to trajectory controller 1003 that is proportional to the amplitude of radiation, such as light, detected by radiation sensor 111 (shown in FIGS. 1-5). Trajectory controller 1003 controls a plurality of control surfaces, such as control surfaces 605 of munition 601 (shown in FIG. 6). If the amplitudes of the signals provided by each of apparatuses 101 is substantially equal, the radiation is propagating substantially along boresight axis 203. In such a situation, munition 601 is traveling along a path toward the source of the radiation. If, however, the amplitudes of the signals provided by each of apparatuses 101 are unequal, trajectory controller 1003 calculates a desired trajectory for munition 601 directed toward the source of the radiation based at least upon the amplitudes of the signals. Trajectory controller 1003 accomplishes the change in trajectory by controlling one or more of control surfaces 605 of munition 601 (shown in FIG. 6).

The present invention provides improved field of view, lower radiation losses, and greater radiation aperture than conventional radiation detection apparatuses.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An apparatus for detecting radiation, comprising:
    an entry window configured to receive radiation from a target, the entry window having an outer surface and an inner surface, such that the outer surface is not parallel to the inner surface;
    a waveguide having an entrance and an exit;
    a reflective conduit extending between the inner surface of the entry window and the entrance of the waveguide; and
    a radiation sensor disposed at the exit of the waveguide;
    wherein at least a portion of the radiation propagated through the entry window further propagates through the reflective conduit and through the waveguide to the radiation sensor.

2. The apparatus, according to claim 1, further comprising:
    a filter disposed between the reflective conduit and the waveguide, such that a portion of the radiation propagated through the reflective conduit is allowed to propagate through the filter.

3. The apparatus, according to claim 2, wherein the filter is a Fabry-Perot filter.

4. The apparatus, according to claim 2, wherein the entry window is configured to refract radiation substantially perpendicular to the filter.

5. The apparatus, according to claim 1, wherein an inner surface of the reflective conduit is polished.

6. The apparatus, according to claim 1, wherein the radiation is one of light visible to a human eye and light non-visible to the human eye.

7. The apparatus, according to claim 1, wherein the radiation sensor is configured to output at least one signal representing at least one characteristic of the radiation.

8. A munition, comprising:
    a body; and
    an apparatus for detecting radiation, operably associated with the body, comprising:
    an entry window configured to receive radiation from a target, the entry window having an outer surface exposed from the body and an inner surface, such that the outer surface is not parallel to the inner surface;
    a waveguide having an entrance and an exit;
    a reflective conduit extending between the inner surface of the entry window and the entrance of the waveguide; and
    a radiation sensor disposed at the exit of the waveguide;
    wherein at least a portion of the radiation propagated through the entry window further propagates through the reflective conduit and through the waveguide to the radiation sensor.

9. The munition, according to claim 8, further comprising:
    a filter disposed between the reflective conduit and the waveguide, such that a portion of the radiation propagated through the reflective conduit is allowed to propagate through the filter.

10. The munition, according to claim 9, wherein the filter is a Fabry-Perot filter.

11. The munition, according to claim 9, wherein the entry window is configured to refract radiation substantially perpendicular to the filter.

12. The munition, according to claim 8, wherein an inner surface of the reflective conduit is polished.

13. The munition, according to claim 8, wherein the radiation is one of light visible to a human eye and light non-visible to the human eye.

14. The munition, according to claim 8, further comprising:
- a plurality of control surfaces; and
- a trajectory controller operably associated with the plurality of control surfaces and the apparatus for detecting radiation.

15. The munition, according to claim 14, wherein the radiation sensor is configured to output at least one signal representing at least one characteristic of the radiation to the trajectory controller.

16. The munition, according to claim 8, wherein the apparatus for detecting radiation is operably associated with a nose of the munition.

17. The munition, according to claim 16, wherein the nose is generally conic in shape.

* * * * *